US012306712B2

United States Patent
Sharon et al.

(10) Patent No.: US 12,306,712 B2
(45) Date of Patent: May 20, 2025

(54) DATA STORAGE DEVICE AND METHOD FOR IDENTIFYING A FAILING AREA OF MEMORY BASED ON A CLUSTER OF BIT ERRORS

(71) Applicant: Western Digital Technologies, Inc., San Jose, CA (US)

(72) Inventors: Eran Sharon, Rishon Lezion (IL); Daniel J. Linnen, Naperville, IL (US); James Tom, Los Altos, CA (US); Nika Yanuka, Hadera (IL); Tomer Eliash, Kfar Saba (IL); Preston Thomson, Boise, ID (US); Kirubakaran Periyannan, Santa Clara, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 14 days.

(21) Appl. No.: 18/230,982

(22) Filed: Aug. 7, 2023

(65) Prior Publication Data

US 2025/0053477 A1 Feb. 13, 2025

(51) Int. Cl.
*G06F 11/07* (2006.01)
*G06F 11/10* (2006.01)
*G06F 11/30* (2006.01)

(52) U.S. Cl.
CPC ............ *G06F 11/102* (2013.01); *G06F 11/07* (2013.01); *G06F 11/1068* (2013.01); *G06F 11/3037* (2013.01)

(58) Field of Classification Search
CPC ...... G06F 11/07; G06F 11/08; G06F 11/3037; G06F 11/1068; G06F 11/0727; G11B 20/1883; G11C 29/838; G11C 29/70
See application file for complete search history.

(56) References Cited

U.S. PATENT DOCUMENTS

| 10,635,324 | B1* | 4/2020 | Klein ..................... G06F 3/0653 |
| 11,513,890 | B1* | 11/2022 | Mekhanik ............. G06F 11/076 |
| 2017/0091026 | A1* | 3/2017 | Gulati ..................... G11C 29/52 |
| 2018/0246794 | A1* | 8/2018 | Baty .................... G06F 11/0727 |
| 2019/0348145 | A1* | 11/2019 | Bradshaw ............ G11C 13/004 |
| 2022/0129187 | A1* | 4/2022 | Miller ................. G06F 11/3037 |

\* cited by examiner

*Primary Examiner* — Yolanda L Wilson
(74) *Attorney, Agent, or Firm* — Crowell & Moring LLP

(57) ABSTRACT

For bit errors caused by intrinsic cell variations, the bit errors are scattered across a page of memory. However, for bit errors caused by a physical issue in memory, the bit errors cluster together within the same memory area. In an example data storage device, a page of memory is divided into sections, and counters are used to count the number of errors in each section. A physical error location is detected if the number exceeds a parameter, and as compared to the number of errors in the other sections. In another example data storage device having an error correction code (ECC) engine, a histogram and binomial probability are used to detect physical errors. This has the advantage of detecting weak memory blocks that are about to fail, so the blocks can be retired early as a grown bad block.

20 Claims, 6 Drawing Sheets

DATA STORAGE DEVICE AND METHOD FOR IDENTIFYING A FAILING AREA OF MEMORY BASED ON A CLUSTER OF BIT ERRORS

BACKGROUND

A data storage device comprises a memory in which to store data Occasionally, bit errors can occur in the memory due to intrinsic variations in the memory cells and/or physical issues, such as wordline shorts. The data storage device can have error detection/correction capabilities to detect and attempt to correct such errors.

DETAILED DESCRIPTION

The following embodiments generally relate to a data storage device and method for identifying a failing area of memory based on a cluster of bit errors. In one embodiment, a data storage device is provided comprising a memory and a controller. The controller is coupled with the memory and configured to: track a number of failed bits in each of a plurality of sections of the memory; determine whether the number of failed bits in a given section of the memory exceeds the number of failed bits in at least one other section of the memory by more than a threshold; and in response to determining that the number of failed bits in the given section of the memory exceeds the number of failed bits in the at least one other section of the memory by more than the threshold, retire the given section of the memory.

In another embodiment, a method is provided that is performed in a data storage device comprising a memory. The method comprises: determining a number of failed bits in each of a plurality of units of data; creating a histogram by tallying units of data that comprise each of a plurality of number of failed bits; calculating a probability of each of the plurality of number of failed bits; determining whether a tally for a given number of failed bits exceeds its respective probability by more than a threshold; and in response to determining that the tally for the given number of failed bits exceeds its respective probability by more than the threshold, retiring the units of data associated with the given number of failed bits.

In yet another embodiment, a data storage device is provided comprising: a memory; and means for retiring an area in the memory in response to determining that bit errors in the area are indicative that the area is at risk of failing.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1A:
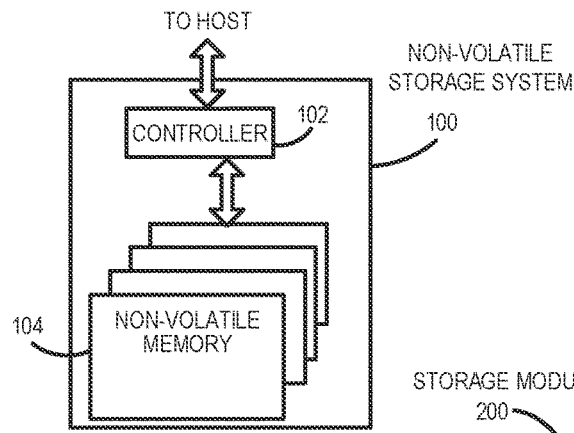
FIG. 1A is a block diagram of a data storage device of an embodiment.
Figure 1B:
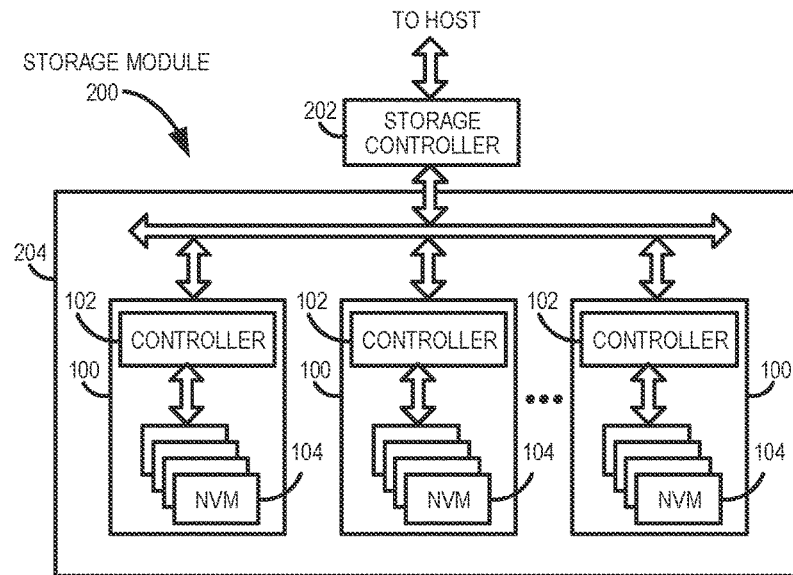
FIG. 1B is a block diagram illustrating a storage module of an embodiment.
Figure 1C:
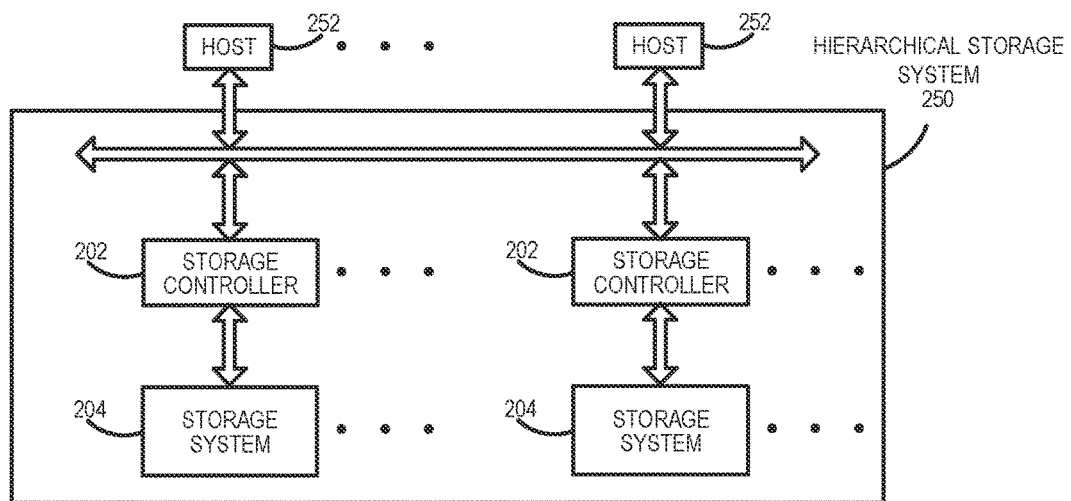
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
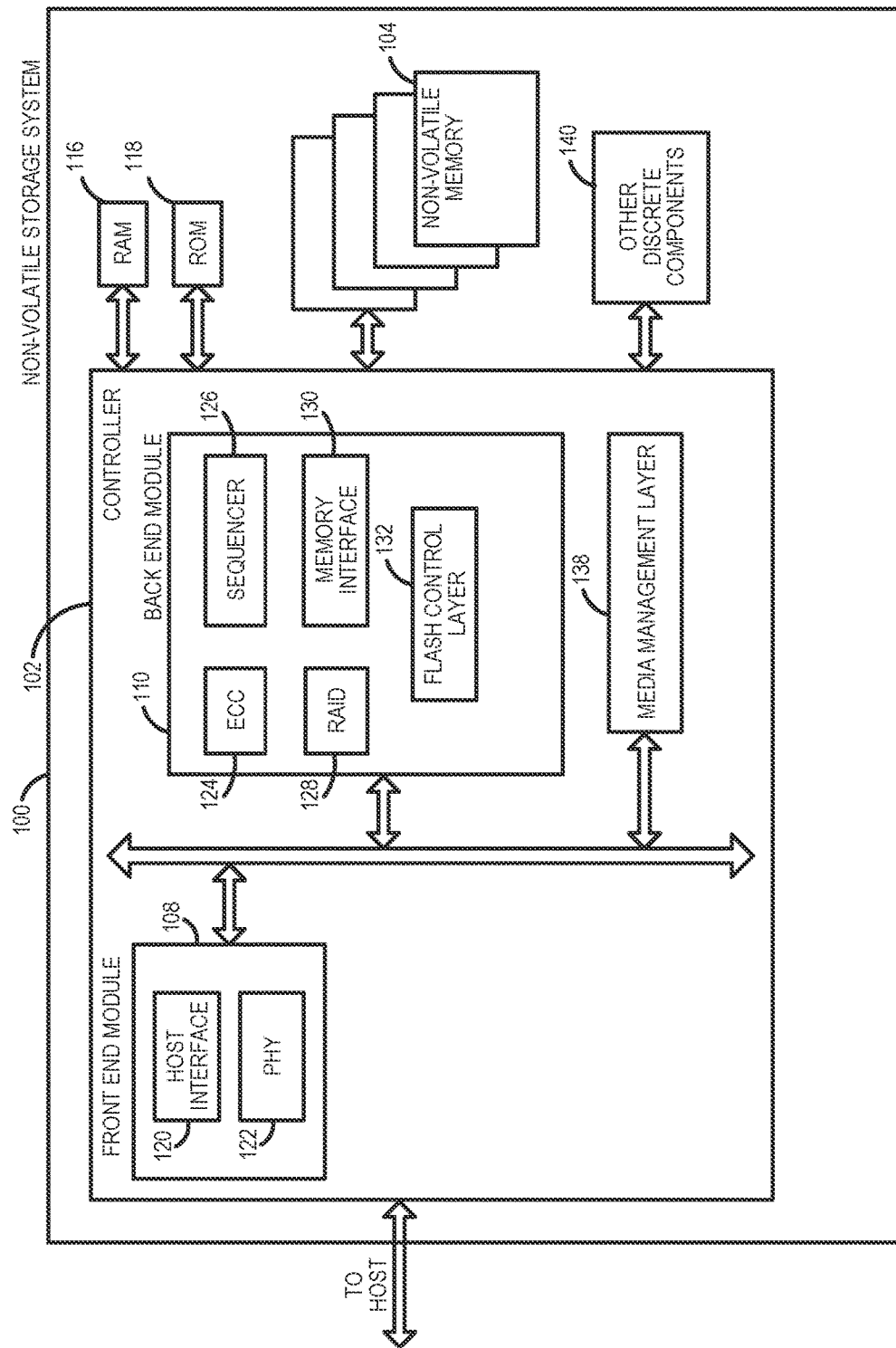
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
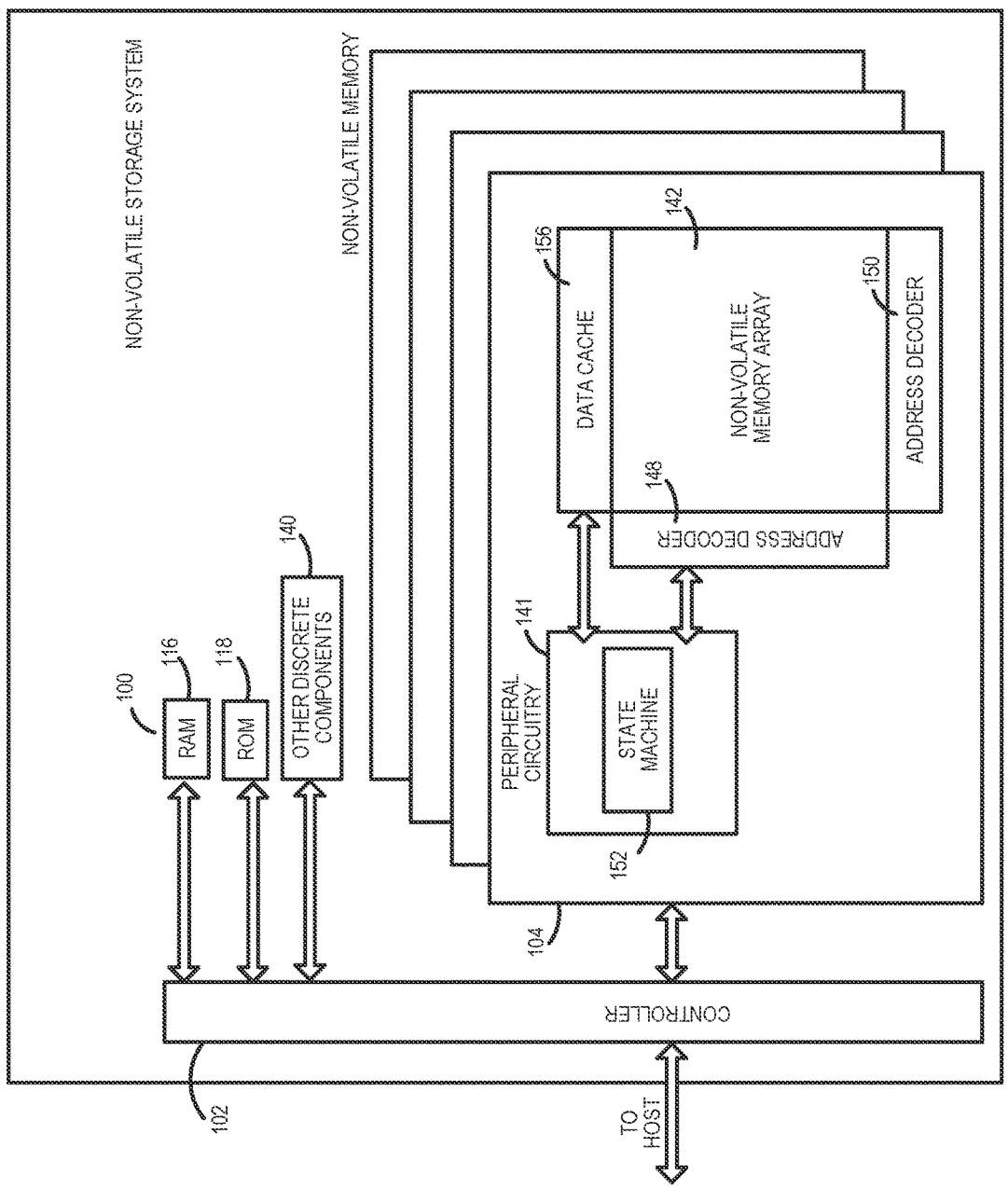
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
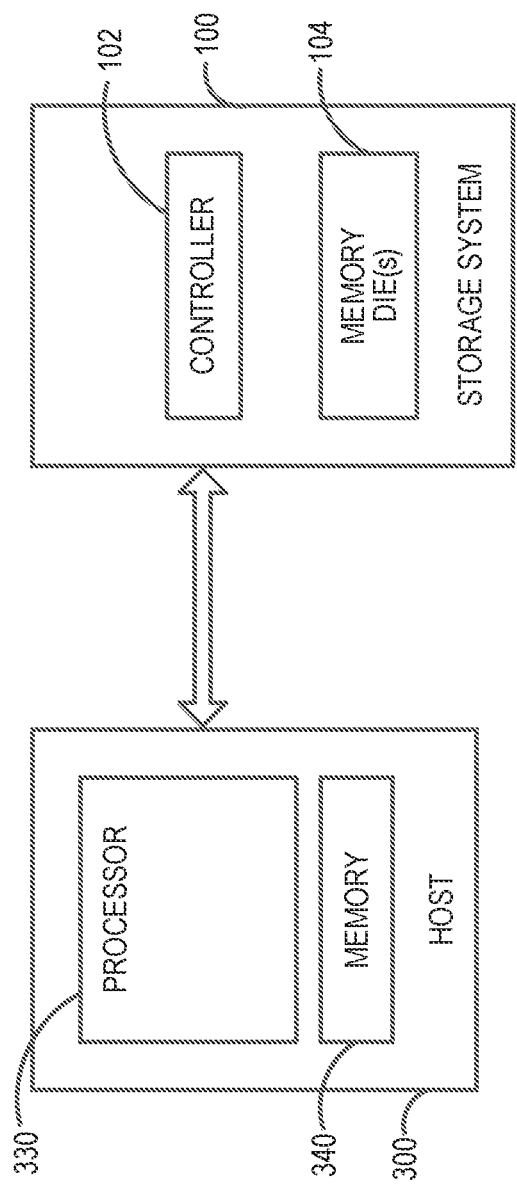
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, bit errors can occur in the memory 104 due to intrinsic variations in the memory cells and/or physical issues, such as wordline shorts. The data storage device 100 can have error detection/correction capabilities to detect and attempt to correct such errors. However, if there are a large number of errors (e.g., due to a localized issue in a portion of the memory 104), a catastrophic failure can occur that can result in the loss of data. The following embodiments recognize that, prior to a catastrophic failure, there are often early signs that hint at the upcoming failure, such as a weak wordline short that can manifest itself as elevated bit error rates in local physical regions. These elevated bit error rates are often lost in the normal sea of bit errors because no attention is given to how they cluster together physically near a short (attention is typically only given when the short is strong enough to cause significantly-abnormal bit error rates.) While such elevated bit error rates would not normally trigger a problem, they can suggest that a failure will occur in the future. So, in one embodiment, when there are enough bit errors to potentially indicate a problem, the controller 102 can map the bit errors to their physical memory locations, which can then be used to determine if there is a local issue. That is, by translating the bit errors from their logical locations to their associated physical locations, the controller 102 can determine if the bits cluster together physically, thus indicating a local issue.

Figure 4:
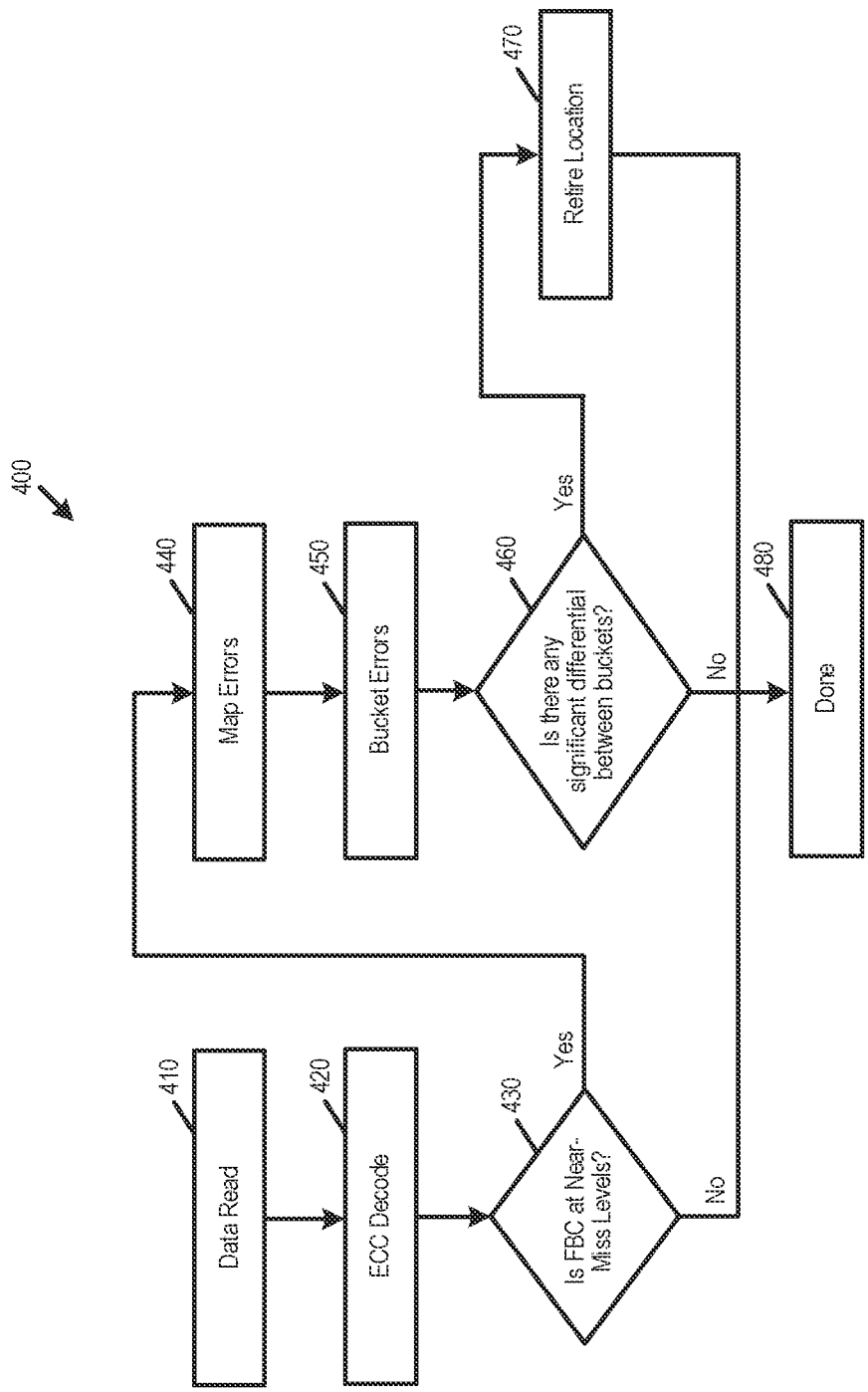
FIG. 4 is a flow chart of a method of an embodiment for identifying a failing area of memory by comparing a fail bit count among different areas of the memory.

Turning again to the drawings, FIG. 4 is a flow chart 400 of a method of an embodiment. As shown in FIG. 4, after the controller 102 reads data from the memory 104 and performs an ECC decode operation on the data (acts 410 and 420), the controller 102 determines if the failed bit count (FBC) is above a certain threshold, which would place the FBC at a "near-miss" level (act 430). As used herein, a "near-miss" level refers to an FBC that is low enough to allow the data to still be decoded but is high enough to indicate that the data may not be decodable in the relatively-near future. By way of example only and not intended as a limitation, in one example, an FBC of about 0.5% may be considered a "near-miss" level in some example implementations.

If the FBC is not at a "near-miss" level, the method ends (act 480). However, if the FBC is at a "near-miss" level, the controller 102 first maps the errors (act 440). In one example implementation, the controller 102 can map all of the bits to their proper physical column in the memory 104 via a table-driven lookup algorithm, where the logical column is the index into the table, and the value is the physical column address. This can give the controller 102 the location of the bit errors. Multiplying by eight would give the bitline/IO/DQ component. In another example implementation, the controller 102 uses a decision tree or equation to map the failed bits. As the physical connections have patterns associated with them, it is possible to know how far each byte is from the previous byte. For example, if the byte is even, it is one byte away from the byte before it. However, if the byte is odd, it is 300 bytes away from the byte before it, unless it is the 10th byte, which is 1,200 bytes away from the byte before it or unless it is the 20th byte, which is after the second byte, as the pattern wraps back around. In yet another example implementation, mapping may be unnecessary as bucketing may be possible independently of mapping.

Next, the controller 102 "buckets" the errors (act 450). In the case of full mapping, the memory 104 can be sliced up into buckets of any suitable resolution. For example, 16K pages can bucket into 32 sectors, which may be good-sized units under many circumstances, as they would be sensitive to differences. Alternatively, it may be easier on the memory 104 to bucket errors into fewer buckets. Buckets can also relate to physical patterns. For example, in the situation where bytes have a pattern that follows a (Logical Byte/2) Modulo 5 and double-byte words wrap their physical region every five words, five divisions can be used as buckets to rapidly bucket the fail bits without having to map them. In implementations that use multiples of two as their "divisions," four, eight, or 16 patterns for bucketing may be preferred. Such regions may align with tiles in a tile architecture, as physical defects can be limited in their scope to a tile.

In architectures where there are column skips, the controller 102 can become aware of the column skips to bucket failing bits appropriately. It is possible for the controller 102 to know the columns, but in some modern data storage devices, bad columns are handled by the memory 104. There is also the possibility of enabling full columns (i.e. no skips) and outputting comparisons from the memory 104 to appropriately count the bits in the proper bucket. The sequence for this can be: output uncorrected data from the memory 104, send uncorrected data to the memory 104, send corrected data to the memory 104, enable full columns, exclusive-or (XOR) uncorrected and corrected data, output XOR of the two data sets with full columns enabled (bucket bits appropriately on system or in stream), and disable full columns. In this situation, the data latch cells would not be responsible for the reason that the columns were skipped or fail in a way that does not impact the bucketing. Also, the bit error pattern can be written into the memory 104, where columns are disabled and then read out. Where a column replacement methodology is used instead of skips, some of the implementations discussed above can be avoided.

Returning to the flow chart 400 in FIG. 4, after the errors are mapped and bucketed, the controller 102 determines if there is any significant differential between the buckets (act 460). If there isn't, the method ends (act 480). However, if there is, the controller 102 retires the memory location (act 470).

There are several advantages associated with these embodiments. For example, NAND is susceptible to physical issues and is only becoming more complicated with more wordlines and tiers. Higher memory hole aspect ratios make NAND more prone to failure. These embodiments can be used to address this problem and do not require any special hardware changes. Thus, these embodiments can be implemented on a variety of designs. Also, as the triggering of these embodiments are flexible, these embodiments can be adapted to a variety of memory types. This flexibility also enables better differentiation between actual problems and elevated bit error rates. Thus, a near miss does not necessarily need to result in a retirement of a block. Instead, a check of the bit error rates can show that they are just elevated but without any particular region being to blame. In this case, the block can continue to be used.

Many alternatives can be used with these embodiments. For example, in some memory designs, bytes are grouped together into words to slow them down from high-speed, single-byte-wide busses to slower (e.g., 16 KB-wide) pages. In the case of bit errors due to intrinsic cell variation, the bit errors would be expected to be relatively scattered across the page. However, where there is a physical issue in the memory 104, the bit errors would cluster together more frequently within the same words/bytes. So, in another embodiment, an ECC engine (e.g., in the controller 102) of the data storage device 100 checks for clustering of the failing bits within words (it is improbable for the bit errors to cluster together in such a way unless there is something physically wrong with the memory 104). In one example implementation of these embodiments, histogram methodology and binomial probability are used to show that bit errors are clustering together in ways that are indicative of a physical issue.

Figure 5:
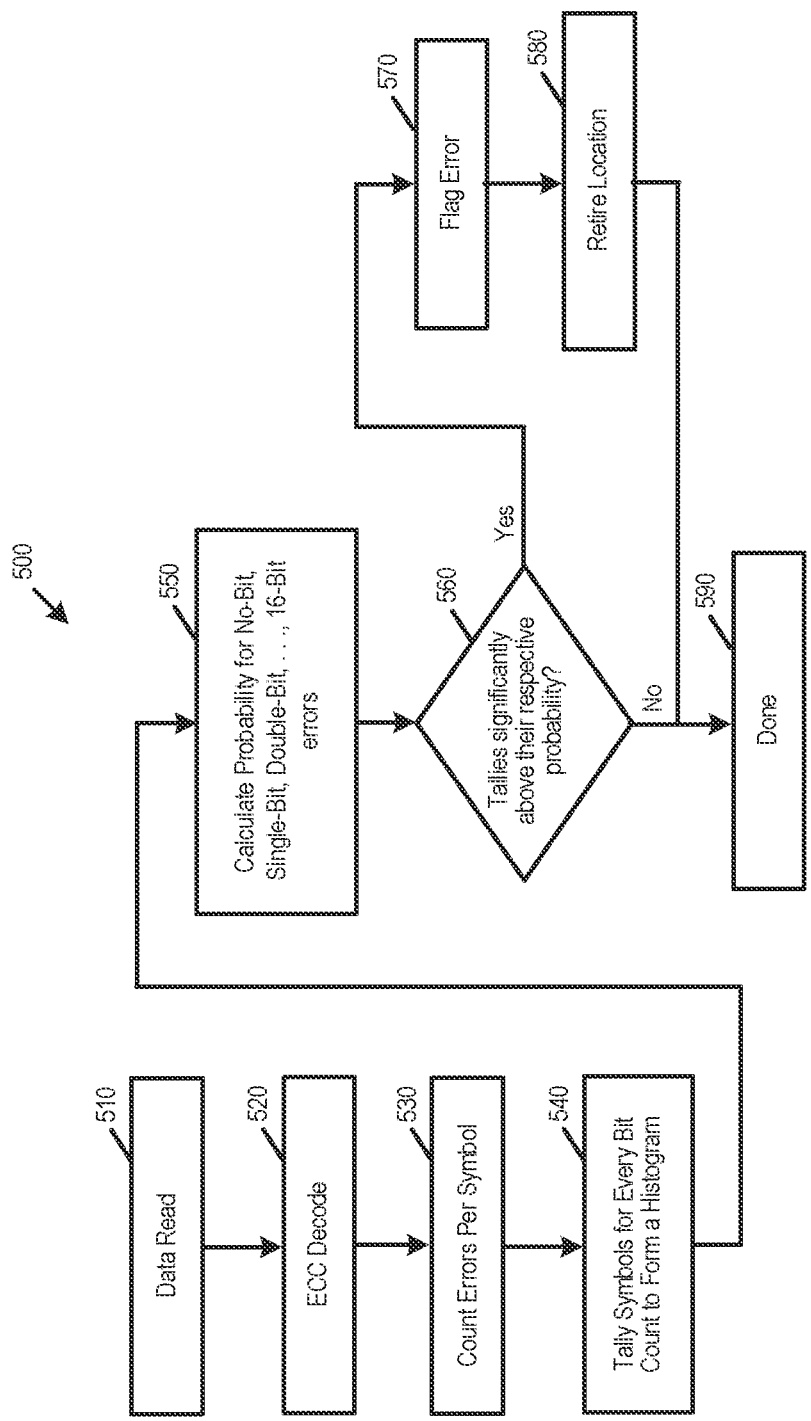
FIG. 5 is a flow chart of a method of an embodiment for identifying a failing area of memory using a histogram and binomial probability.

Turning again to the drawings, FIG. 5 is a flow chart 500 of a method of an embodiment. As shown in FIG. 5, after the controller 102 reads data and performs an ECC decode operation (acts 510 and 520), the controller 102 counts the number of errors per symbol (act 530). As used herein, a symbol refers to a physically- and logically-contiguous chunk of data, making it easy to check for clustering. In one example implementation, a symbol is a double-byte word; in other example implementations, a system is a quad-byte or greater word.

Next, the controller 102 tallies symbols for every bit count to form a histogram (act 540). Then, the controller 102 calculates the probability for no-bit, single-bit, double-bit, . . . , N-bit (e.g., 16 bit) errors (act 550). The controller 102 then determines if the tallies are significantly above their respective probabilities (act 560). For example, the probability of a given bit error rate for a symbol can be calculated via a binomial distribution. Poisson's distribution can be used to determine the significance of deviations from the binomial probability. Although the above mathematical methods allow for the quantification of required information, other methods can be used, some of which may not involve a calculation. For example, two bits in error within the same symbol are very unlikely if there are 1K symbols and 30 bits in error that were randomly distributed. The occurrence of five symbols with two bits in error each would indicate a clustering of the errors regardless of the binomial or Poisson's distributions, as 33% of the bits clustering in the same symbols (when they should be randomly distributed) is an unexpected result and indicative of a problem.

If the tallies are not significantly above their respective probabilities, the method ends (act 590). However, if the tallies are significantly above their respective probabilities, the controller 102 flags the error (act 570) and retires the location (act 580).

There are many advantages associated with these embodiments. For example, in the case of solid-state drive (SSD) application-specific integrated circuits (ASICs), they are pin-limited, rather than gate-limited, so there is spare real-estate for the use of these embodiments (but, in some implementations, the hardware changes to the ECC engine can be relatively minimal or even executed in firmware) Also, executing this embodiment in the ECC engine can be very fast and would not have to be in a critical path, so the impact to performance can be non-existent if desired or negligible, depending on implementation.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
a processor coupled with the memory and configured to:
track a number of failed bits in each of a plurality of sections of the memory;
determine whether the number of failed bits in a given section of the memory exceeds the number of failed bits in at least one other section of the memory by more than a threshold; and
in response to determining that the number of failed bits in the given section of the memory exceeds the number of failed bits in the at least one other section of the memory by more than the threshold, retire the given section of the memory.

2. The data storage device of claim 1, wherein the processor is further configured to:
in response to determining that the number of failed bits in the given section of the memory does not exceed the number of failed bits in the at least one other section of the memory by more than the threshold, continue using the given section of the memory.

3. The data storage device of claim 1, wherein the failed bits that are tracked are those that exceed a failed bit count (FBC) level.

4. The data storage device of claim 1, wherein the processor is further configured to track the number of failed bits in each of the plurality of sections of the memory by:
detecting a failed bit; and
determining a physical location in the memory that stores the failed bit.

5. The data storage device of claim 4, wherein the processor is further configured to determine the physical location in the memory that stores the failed bit by mapping a logical address of the failed bit to a physical address in the memory.

6. The data storage device of claim 5, wherein the failed bit is mapped to a physical column in the memory via a table-driven lookup algorithm, where a logical column is an index into a table and a resulting value is a physical column address.

7. The data storage device of claim 5, wherein a decision tree is used to map the failed bit.

8. The data storage device of claim 5, wherein an equation is used to map the failed bit.

9. The data storage device of claim 1, wherein the processor is further configured to track the number of failed bits in each of the plurality of sections of the memory by using counters in the plurality of sections.

10. The data storage device of claim 1, wherein the plurality of sections correspond to physical patterns in the memory.

11. The data storage device of claim 1, wherein the processor is further configured to account for column skips in performing the tracking.

12. The data storage device of claim 1, wherein the memory comprises a three-dimensional memory array.

13. In a data storage device comprising a memory, a method comprising performing using an error correction code (ECC) engine:
determining a number of failed bits in each of a plurality of units of data;
creating a histogram by tallying units of data that comprise each of a plurality of number of failed bits;
calculating a probability of each of the plurality of number of failed bits;
determining whether a tally for a given number of failed bits exceeds its respective probability by more than a threshold; and
in response to determining that the tally for the given number of failed bits exceeds its respective probability by more than the threshold, retiring the units of data associated with the given number of failed bits.

14. The method of claim 13, further comprising:
in response to determining that the tally for the given number of failed bits does not exceed its respective probability by more than the threshold, continuing to use the units of data associated with the given number of failed bits.

15. The method of claim 13, wherein the probability is calculated using a binomial distribution.

16. The method of claim 13, wherein the probability is calculated using a Poisson distribution.

17. The method of claim 13, wherein a unit of data is physically- and logically-contiguous in the memory.

18. The method of claim 13, wherein the units of data are double-byte words.

19. The method of claim 13, wherein the units of data are quad-byte or greater words.

20. A data storage device comprising:
a memory; and
means for:
tracking a number of failed bits in each of a plurality of sections of the memory;
determining whether the number of failed bits in a given section of the memory exceeds the number of failed bits in at least one other section of the memory by more than a threshold; and
in response to determining that the number of failed bits in the given section of the memory exceeds the number of failed bits in the at least one other section of the memory by more than the threshold, retiring the given section of the memory.

* * * * *